United States Patent
Weinberg

(10) Patent No.: US 10,229,596 B1
(45) Date of Patent: Mar. 12, 2019

(54) SYSTEMS AND METHODS FOR MEASURING A BRIDGE CLEARANCE

(71) Applicant: Analog Devices, Inc., Norwood, MA (US)

(72) Inventor: Harvey Weinberg, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 15/726,086

(22) Filed: Oct. 5, 2017

(51) Int. Cl.
| | |
|---|---|
| *G08G 1/16* | (2006.01) |
| *G06K 9/00* | (2006.01) |
| *G08G 1/0967* | (2006.01) |
| *B60R 1/00* | (2006.01) |

(52) U.S. Cl.
CPC ............. *G08G 1/165* (2013.01); *B60R 1/00* (2013.01); *B60W 2420/52* (2013.01); *G06K 9/00805* (2013.01); *G08G 1/096708* (2013.01)

(58) Field of Classification Search
CPC . G08G 1/165; B60Q 9/008; B60R 2300/8093
USPC ........................................................ 340/435
See application file for complete search history.

(56) References Cited

U.S. PATENT DOCUMENTS

| | | | |
|---|---|---|---|
| 9,086,275 B2 | 7/2015 | Weinberg et al. | |
| 2007/0219720 A1* | 9/2007 | Trepagnier | B60W 30/00 701/300 |
| 2011/0040482 A1* | 2/2011 | Brimble | G01S 7/4814 701/301 |
| 2012/0299712 A1* | 11/2012 | Sowa | G08G 1/095 340/435 |
| 2013/0222592 A1 | 8/2013 | Gieseke | |
| 2017/0246990 A1* | 8/2017 | Rosenblum | B60Q 9/008 |

OTHER PUBLICATIONS

"Efficient Measurement of Bridge and Overhead Structure Clearance Information at Posted Highway Speeds", VueWorks Blog, URL: http://www.vueworks.com/efficient-measurement-of-bridge-and-overhead-structure-clearance-information-at-posted-highway-speeds-2/, (accessed Jul. 18, 2018), 6 pgs.
"Obstacle Detection for High Speed Autonomous Navigation", Field Robotics Center, Carnegie Mellon University, Pittsburgh PA 15213, (Apr. 9, 1991), 8 pgs.
Watson, Christopher, et al., "3D Terrestrial LiDAR for Operational Bridge Clearance Measurements", SPIE Proceedings, vol. 7983, Radar/Lidar NDE Technologies.
Yen, Kin S., et al., "LiDAR for Data Efficiency", WA-RD 778.1, (Sep. 30, 2011), 101 pgs.

\* cited by examiner

*Primary Examiner* — Fabricio R Murillo Garcia
(74) *Attorney, Agent, or Firm* — Schwegman Lundberg & Woessner, P.A.

(57) ABSTRACT

A lidar system can be provided for measuring a clearance of overhead infrastructure, such as a bridge or overpass. The lidar system can alert a vehicle driver or automatically brake the vehicle if the available clearance is smaller than a height of the vehicle. The lidar system can emit rays of light over a range of angles towards a target region where the rays of light can have a vertical span. The lidar system can then receive rays of light reflected or scattered from the target region and can determine a distance traveled by the rays of light by determining a round trip travel time of the rays. A clearance of the overhead infrastructure can then be determined using geometric relationships.

20 Claims, 5 Drawing Sheets

SYSTEMS AND METHODS FOR MEASURING A BRIDGE CLEARANCE

FIELD OF THE DISCLOSURE

The present disclosure relates to systems and methods for measuring an overhead clearance, such as a bridge clearance.

BACKGROUND

Certain infrastructure, such as a bridge or overpass, can provide a clearance for a vehicle. A vehicle taller than the provided clearance can cause damage to the infrastructure.

SUMMARY OF THE DISCLOSURE

In certain systems, a camera or radar can be used to observe features surrounding a vehicle, such as infrastructure (e.g., a bridge or overpass) features. However, such systems may lack the spatial resolution to identify a clearance of the infrastructure, such as when used in a moving vehicle. The inventors have recognized, among other things, the need for a low cost system that can accurately detect an infrastructure clearance and can provide an alert to a vehicle operator or can automatically brake the vehicle if the infrastructure clearance is smaller than a vehicle height.

In an aspect, the disclosure can feature a method for determining a clearance of an overhead obstacle in a lidar system. The method can include emitting rays of light from a vehicle over a range of angles towards a target region, the rays of light can establish a vertical angular span. The method can also include in response, receiving rays of light from the target region. The method can also include determining a horizontal distance from the vehicle to a location where the received rays of light can interact with the target region. The method can also include determining a height of the overhead obstacle, such as by using a pair of received rays of light, wherein a first ray of the pair can interact with the overhead obstacle and a second ray of the pair can interact with a ground feature and the first ray and the second ray can correspond to the same horizontal distance. The method can also include selecting a first received ray of light that can interact with the overhead obstacle. The method can also include selecting two received rays of light that can interact with a ground feature underlying the overhead obstacle and estimating a second received ray of light from the two received rays that can interact with the ground feature, where the estimated second received ray and the first received ray can correspond to the same horizontal distance from the vehicle. The method can also include determining a height of the overhead obstacle, such as by using the first and second received rays of light. The method can also include simultaneously emitting rays of light from a vehicle over a range of angles towards a target region, where the rays of light can establish a vertical angular span. The method can also include receiving the rays of light using a one-dimensional array of pixels, wherein each pixel can correspond to a range of angles. The method can also include determining a distance from the lidar system to the ground and then using the determined distance, such as to determine a horizontal distance from the vehicle to a location where the received rays of light can interact with the target region, such as by using the height of the lidar system that can be attached to the vehicle. The method can also include generating an alert where a determined height of the overhead obstacle can be smaller than the vehicle height. The method can also include automatically braking the vehicle where a determined height of the overhead obstacle can be smaller than the vehicle height. The method can also include determining a height of the overhead obstacle for multiple pairs of received rays of light, wherein each individual pair of rays can include rays that have the same horizontal distance. The method can also include selecting a minimum determined height of the overhead obstacle as the height of the overhead obstacle. The overhead infrastructure can include a bridge or overpass.

In an aspect, the disclosure can feature a system for determining a clearance of an overhead obstacle for a vehicle. The method can include a transmitter, such as which can be configured to emit rays of light over a range of angles towards a target region, where the rays of light can establish a vertical angular span. The method can also include a receiver, such as which can be configured to receive rays of light from the target region. The method can also include control circuitry, such as which can be configured to determine a horizontal distance from the vehicle to a location where the received rays of light can interact with the target region and determine a height of the overhead obstacle, such as by using a pair of received rays of light, where a first ray of the pair can interact with the overhead obstacle and a second ray of the pair can interact with a ground feature and the first ray and the second ray can have the same horizontal distance. The control circuitry can be configured, such as to select a first received ray of light that can interact with the overhead obstacle, select two received rays of light that can interact with a ground feature underlying the overhead obstacle and estimate a second received ray of light from the two received rays that can interact with the ground feature, where the estimated second received ray and the first received ray can correspond to the same horizontal distance from the vehicle, and determine a height of the overhead obstacle, such as by using the first and second received rays of light. The transmitter can be configured to simultaneously emit rays of light over a range of angles towards a target region, where the rays of light can establish a vertical angular span. The system can also include a one-dimensional array of pixels wherein each pixel can correspond to a range of angles of the received light. The control circuitry can be configured to use a determined distance from the lidar system to the ground, such as to determine a horizontal distance from the vehicle to a location where the received rays of light can interact with the target region. The control circuitry can be configured to generate an alert where a determined height of the overhead obstacle can be smaller than the vehicle height. The control circuitry can be configured to automatically brake the vehicle where a determined height of the overhead obstacle can be smaller than the vehicle height. The control circuitry can be configured to determine a height of the overhead obstacle for multiple pairs of received rays of light, wherein each individual pair of rays can include rays that have the same horizontal distance. The control circuitry can be configured to select a minimum determined height of the overhead obstacle as the height of the overhead obstacle.

In an aspect, the disclosure can feature a system for determining a clearance of an overhead obstacle for a vehicle. The system can include means for emitting rays of light from a vehicle over a range of angles towards a target region, where the rays of light can establish a vertical angular span. The means for emitting rays of light can include a transmitter, such as the transmitter 115 as illustrated in FIG. 1B. The system can also include means for receiving rays of light from the target region, such as in response to the emitted rays of light. The means for receiving rays of light can include a receiver, such as the receiver 120 as illustrated in FIG. 1B. The system can also include means for determining a horizontal distance from the vehicle to a location where the received rays of light can interact with the target region and determining a height of the overhead obstacle, such as by using a pair of received rays of light, wherein a first ray of the pair can interact with the overhead obstacle and a second ray of the pair can interact with a ground feature and the first ray and the second ray can have the same horizontal distance. The means for determining a horizontal distance can include control circuitry, such as the control circuitry 110 as illustrated in FIG. 1B.

BRIEF DESCRIPTION OF THE DRAWINGS

The present disclosure will now be described, by way of example, with reference to the accompanying drawings, in which.

DETAILED DESCRIPTION

Trucks can cause accidents and damage infrastructure, such as by colliding with bridges, overpasses, or other overhead infrastructure where a height of the truck is taller than an available clearance. The overhead infrastructure can be present on a highway, urban setting, or suburban setting. The inventors have recognized among other things, the need for a low cost lidar system that can be used to detect the clearance of overhead infrastructure, such as to prevent collisions and damage to vehicles and or the overhead infrastructure. Other systems, such as radar or camera based systems may not be suitable for determining an overhead clearance as they may lack the necessary visual resolution. Described below is a lidar system for measuring an available clearance and alerting a vehicle driver or automatically braking the vehicle if the available clearance is smaller than a height of the vehicle.

Figure 1A:
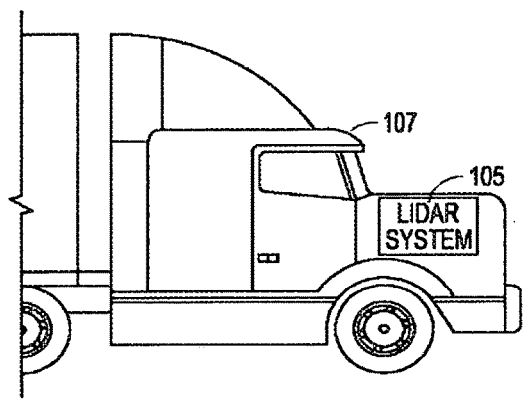
FIG. 1A illustrates an example of a vehicle mounted lidar system.

FIGS. 1A and 11B illustrate an example of a lidar system for determining an infrastructure clearance, such as for a vehicle. The lidar system can be employed in consumer, military, industrial, or other applications. The lidar system 105 can be included in or mounted to a vehicle 107. The lidar system 105 can include control circuitry 110, a transmitter 115, and a receiver 120. The control circuitry 110 can be connected to the transmitter 115 and the receiver 120. The transmitter 115 can include one or more infrared light emitting diodes or infrared laser diodes. During operation, the control circuitry 110 can instruct the transmitter 115 to emit a light beam 125 towards a target 130. The transmitter 115 can illuminate a field of regard using a single pulse of light. In an example, the light beam 125 can be steered across the field of regard, such as by using an electro-optic waveguide, a moveable mirror, a stationary optic (e.g., a beam splitter), or any other type of active optic. The light beam can illuminate the target 130. The receiver 120 can then receive a portion of a light beam 135 that can be reflected or scattered from the target 130. The control circuitry 110 can then determine a round trip travel time of the light beam, such as by comparing a time when the light beam 125 was emitted towards the target 130 and a time when the light beam 135 was received by the receiver 120. A distance to the target 130 can then be determined according to the expression d=tc/2, where d can represent a distance from the lidar system 105 to the target 130, t can represent a round trip travel time, and c can represent a speed of light. The receiver 120 can include an array of pixels 121, such as can be used to receive the portion of the light beam from the target region. In an example, the array of pixels (e.g., photodiodes) 121 can include a one-dimensional array of pixels, and each pixel in the array of pixels can receive a portion of the light beam (e.g., a ray) corresponding to an angle or a range of angles. In another example, the array of pixels (e.g., photodiodes) 121 can include a two-dimensional array of pixels.

A number of pixels in the array of pixels 121 can be desired to be reduced, such as to reduce the cost and complexity of the lidar system 105. Overhead infrastructure such as bridges or overpasses can include predominately horizontal features and can be parallel to the ground beneath them. A one-dimensional array including single pixels in the horizontal dimension can be used to detect such overhead infrastructure without loss of performance, as explained herein. In an example where the array of pixels 121 can be a one-dimensional array of pixels, the one-dimensional array of pixels can include between 12 and 24 pixels. In a vertical dimension, a field of view can be in a range from 2 to 5 degrees, corresponding to a resolution in the vertical dimension of approximately 0.2 degrees. In an example, a resolution in the vertical dimension can be 1 degree or less. At a distance of about 100 meters, an angular deviation of 0.2 degrees can correspond to an offset of about 14 inches. In a horizontal dimension, a field of view can be in a range of 1.5 to 3 degrees. At a distance of about 100 meters, a field of view of 1 degree can correspond to 1.7 meters. Thus, a field of view in a horizontal dimension in a range of 1.5 to 3 degrees can span a width of a lane or other overhead infrastructure.

Figure 1B:
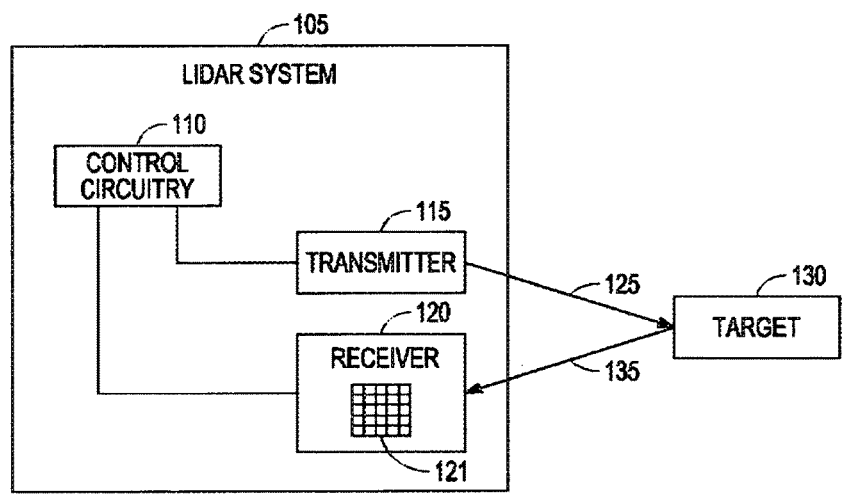
FIG. 1B illustrates an example of a lidar system.
Figure 1C:
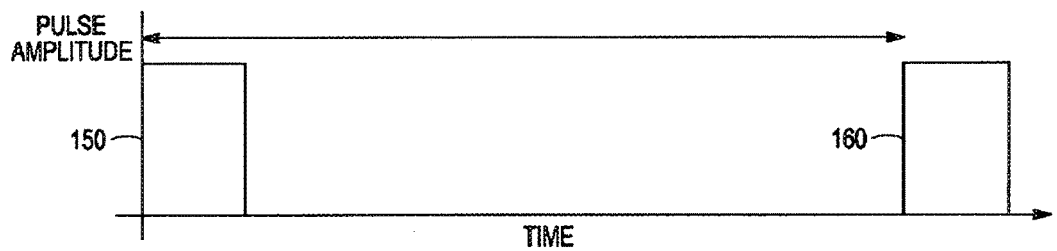
FIG. 1C illustrates an example of operation of a lidar system.

FIG. 1C illustrates an example of a transmitted pulse 150 and a received pulse 160. A time difference between the transmitted pulse 150 and the received pulse 160 can be determined, such as by comparing leading edges of the respective pulses. The time difference between the pulses can be used to determine a distance between the vehicle 107 and the target 130. In an example where a number of rays are emitted in a single pulse, each ray can be received by one or more pixels in the array of pixels 121 and a distance from the vehicle 107 to the target 130 can be determined for each of the rays. The received pulse 160 can be sampled, and then stored and processed at least in part in the analog domain.

Figure 2A:
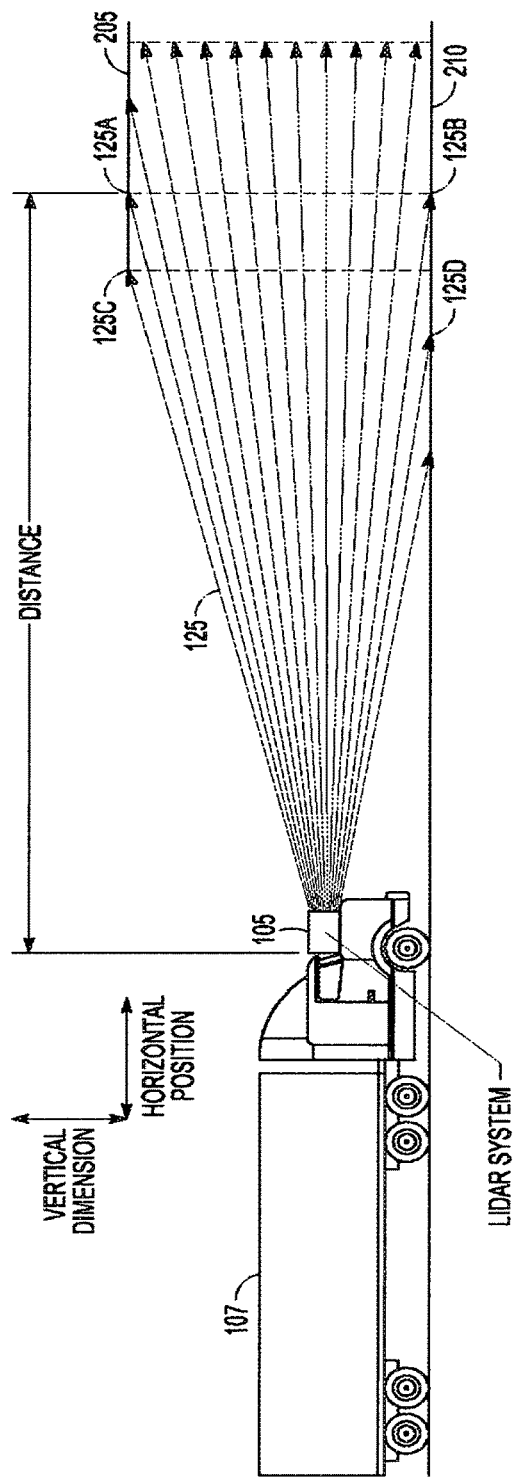
FIG. 2A illustrates an example of operation of a lidar system.
Figure 2B:
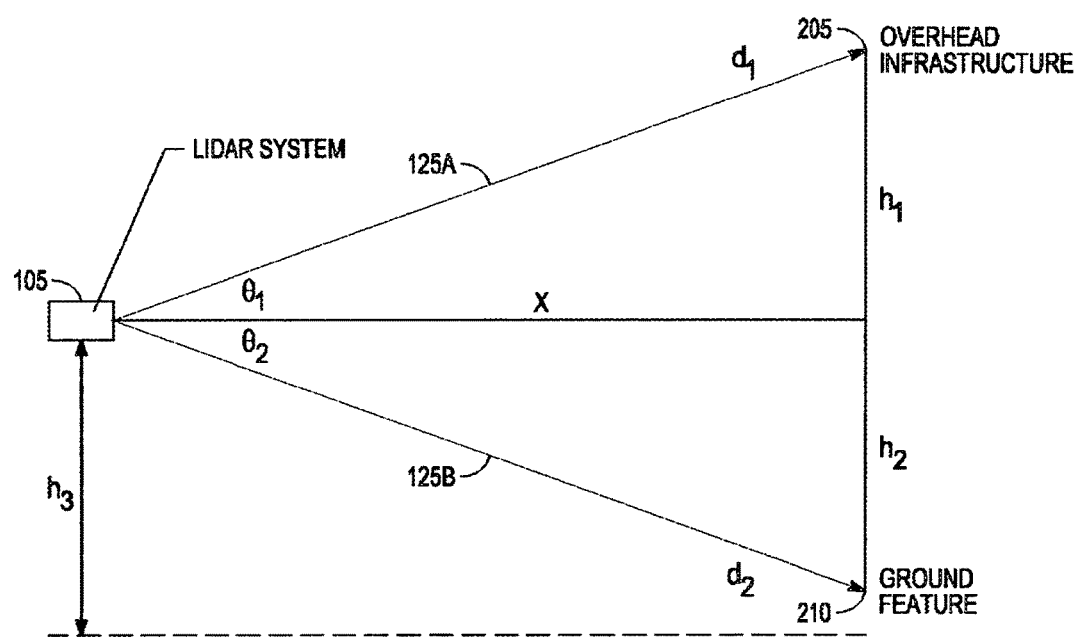
FIG. 2B illustrates an example of geometry in a lidar system.

FIG. 2A illustrates an example of operation of a lidar system, such as the lidar system 105. The lidar system 105 can emit a light beam 125. The light beam can include rays that span a range of angles in a vertical dimension, where an individual ray can correspond to an angle, or a range of angles. The rays can be received by the lidar system 105 after being reflected or scattered by a target region. The target region can include overhead infrastructure 205, such as a bridge or an overpass. The target region can also include a ground feature 210, such as a road. A distance from the lidar system 105 to the target region can be determined for a received ray, such as based on a round trip travel time of the received ray (e.g., by using the equation d=tc/2). A horizontal distance (e.g., a distance along a horizontal dimension) can then be determined using the distance determined from the round trip travel time of the received ray, an angle of the received ray, and a location of the lidar system 105 on the vehicle. The distance from the ground to the lidar system 105 can be measured during installation of the lidar system 105. A distance from the ground feature 210 to the overhead infrastructure 205 can then be determined using a pair of rays, such as a first ray 125a and a second ray 125b. The first ray 125a can interact with the overhead infrastructure 205. The second ray 125b can interact with the ground feature 210 and can correspond to the first ray 125a (e.g., a horizontal distance of the second ray 125b can be the same as the horizontal distance of the first ray 125a). The distance from the overhead infrastructure 205 to the ground feature 210 can be determined using geometric relationships, such as illustrated in FIG. 2B. A distance from the lidar system 105 to the ground can be represented by $h_3$. A distance can be determined for each of the rays 125a and 125b, such as based on a round trip travel time (e.g., by using the equation d=tc/2). $\theta_1$ and $\theta_2$ can represent angles of rays 125a and 125b, respectively, where the angles of the rays 125a and 125 can be known based on operation of the lidar system 105 (e.g., rays can be emitted/received at known angles). x can represent a horizontal distance from the lidar system 105 to the overhead infrastructure and ground feature. A vertical distance ($h_1$) can then be determined according to the geometric relationship $h_1$=d sin $\theta_1$ and a vertical distance ($h_2$) can then be determined according to the geometric relationship $h_2$=d sin $\theta_2$. A distance from the overhead infrastructure 210 to the ground feature can then be determined, such as by adding $h_1$ and $h_2$. The distance from the overhead infrastructure 205 to the ground feature 210 can then be compared to a height of the vehicle 107. If the height of the vehicle 107 is larger than the distance from the overhead infrastructure 205 to the ground feature 210, an alarm can sound to alert a driver of the vehicle 107 or the vehicle 107 can automatically brake to avoid colliding with the overhead infrastructure 205. In an example, if the height of the vehicle 107 is larger than the determined distance from the overhead structure 205 to the ground feature 210, a subsequent measurement of the distance can be made at a later time to confirm the determined distance from the overhead structure 205 to the ground feature 210 before alerting the driver of the vehicle 107 or automatically braking the vehicle. There may not be a corresponding ray that interacts with the ground feature 210. For example, a ray 125c can interact with the overhead infrastructure 205 and there may not be a ray interacting with the ground feature 210 that has a same horizontal distance as the ray 125c. In such an example, a distance from the ground feature 210 to the overhead infrastructure 205 can be determined using the ray 125c and an estimated ray. The estimated ray can be computed using rays below the ray 125c that have different horizontal distances. For example, rays 125b and 125d can be used to provide an estimated ray (e.g., by using interpolation) that has the same horizontal distance as the first ray 125c. The estimated ray can then be used, together with the ray 125c to determine a distance from the ground feature 210 to the overhead infrastructure 205. In an example, the lidar system can be used to measure an overhead clearance within a range of 50 meters, where the lidar system can include a vertical resolution of 0.5 degrees and can measure the accuracy within 50 cm and can offer approximately 3 seconds of warning at a speed of approximately 60 km/hr. To increase the warning time, the range of the lidar system 105 can be increased.

Figure 2C:
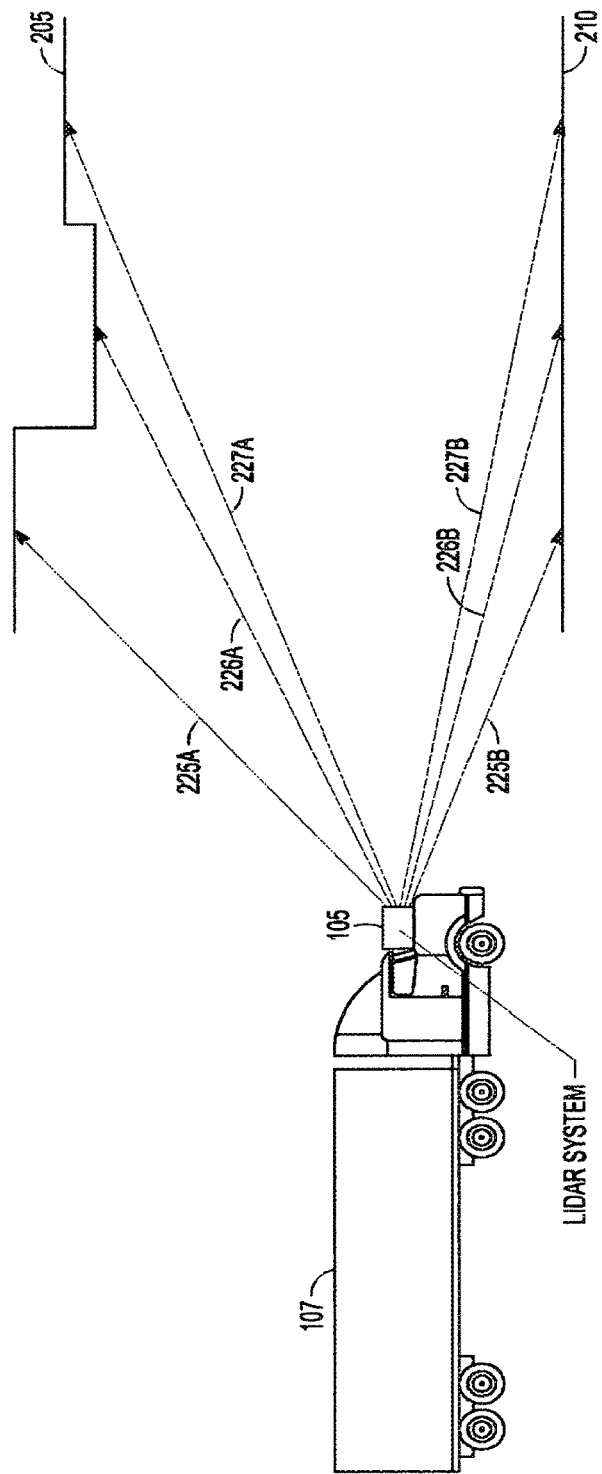
FIG. 2C illustrates an example of operation of a lidar system.

FIG. 2C illustrates an example where the overhead infrastructure 205 may have a varying height that changes with a horizontal distance from the vehicle 107. The lidar system 105 can emit a light beam that includes pairs of rays 225a and 225b, 226a and 226b, and 227a and 227b that span a range of angles in a vertical dimension. A distance from the ground feature 210 to the overhead infrastructure 205 can then be determined using each of the pairs of rays corresponding to the same horizontal distance as described above with respect to FIGS. 2A and 2B. Control circuitry, such as control circuitry 110 can then determine the distance from the ground feature 210 to the overhead structure 205, such as by selecting a minimum of the distances determined for each of the pairs of rays. The determined distance from the ground feature 210 to the overhead structure 205 can then be used to sound an alarm to alert a driver of the vehicle 107 or the vehicle 107 can be automatically braked to avoid colliding with the overhead infrastructure 205.

Figure 3:
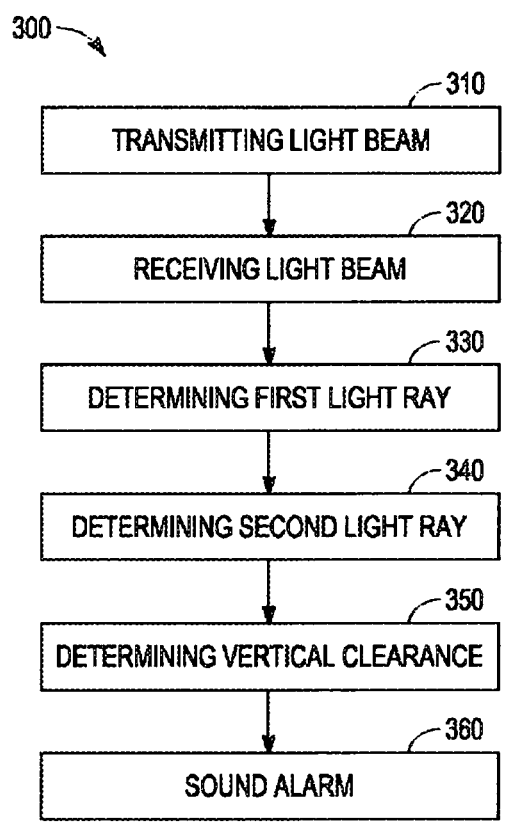
FIG. 3 illustrates an example of a method of operation of a lidar system.

FIG. 3 illustrates a method of operating a lidar system, such as the lidar system 105 as illustrated in FIG. 1. A transmitter, such as the transmitter 115 can transmit a light beam, such as to illuminate a target region (step 310). The light beam can be received from the target region by a receiver, such as the receiver 120 (step 320). The received light beam can be reflected or scattered by the target region. Control circuitry, such as the control circuitry 110 can then determine a ray received from overhead infrastructure, such as overhead infrastructure 205 (step 330). In an example, a vertical height of a ray can be determined using the distance determined from a round trip travel time of the received ray, an angle of the received ray, and a location of the lidar system 105 on the vehicle. A ray received from a vertical height within a vertical range (e.g., a vertical height in a vertical range from 10 feet to 25 feet) can be determined as being received from overhead infrastructure. Control circuitry, such as the control circuitry 110 can then determine a ray received from a ground feature, such as the ground feature 210 (step 340). The control circuitry 110 can determine a ray received from a ground feature having a same horizontal distance as the received ray from the overhead infrastructure. The horizontal distance of the rays can be determined from a distance based on a round trip travel time, an angle of a received ray, and a location of the lidar system 105 on the vehicle 107. In an example where no ray received from the ground feature has a same horizontal distance as the received ray from the overhead structure, the control circuitry 110 can determine an estimated ray. The estimated ray can be computed using rays received from the ground feature 210, for example by interpolation. The estimated ray can have a same horizontal distance as the ray received from the overhead infrastructure 205. Control circuitry, such as the control circuitry 110 can then determine a vertical clearance using the ray received from the overhead infrastructure 205 and the ray received from the ground feature 210 or an estimated ray having the same horizontal distance (step 350). If the determined vertical clearance is smaller than a height of the vehicle, an alarm can be sounded to alert a driver of the vehicle or the vehicle can be automatically braked, such as to prevent the vehicle from colliding with the overhead infrastructure (step 360).

Each of the non-limiting aspects described herein can stand on its own, or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for determining a clearance of an overhead obstacle using an optical detection system, the method comprising:
   emitting rays of light from a vehicle over a range of angles towards a target region, the rays of light establishing a vertical angular span;
   receiving rays of reflected or scattered light from the target region corresponding to the emitted rays of light from the vehicle;
   determining a height of the overhead obstacle using the received rays of light, including:
   selecting a first received ray of light that interacts with the overhead obstacle;
   selecting two received rays of light that interact with a roadway underlying the overhead obstacle; and
   estimating a second received ray of light from the two received rays that interact with the roadway, the estimated second received ray and the first received ray corresponding to the same horizontal distance from the vehicle.

2. The method of claim 1, comprising simultaneously emitting the rays of light from the vehicle over a range of angles towards the target region, the simultaneous-emitted rays of light establishing the vertical angular span.

3. The method of claim 1, wherein the receiving the rays of light comprises using a one-dimensional array of pixels, wherein each pixel corresponds to a range of angles.

4. The method of claim 1, comprising determining a distance from the optical detection system to the ground and then using the determined distance to determine a horizontal distance from the vehicle to the location where the received rays of light interact with the target region using the height of the optical detection system attached to the vehicle.

5. The method of claim 1, comprising generating an alert if a determined height of the overhead obstacle is smaller than the vehicle height.

6. The method of claim 1, comprising automatically braking the vehicle if a determined height of the overhead obstacle is smaller than the vehicle height.

7. The method of claim 1, comprising determining the height of the overhead obstacle for multiple pairs of received rays of light, wherein each individual pair of rays includes rays that have the same horizontal distance.

8. The method of claim 7, comprising selecting a minimum determined height of the overhead obstacle as the height of the overhead obstacle.

9. The method of claim 1, wherein the overhead infrastructure includes a bridge or overpass.

10. A system for determining a clearance of an overhead obstacle for a vehicle, the method comprising:
    a transmitter configured to emit rays of light over a range of angles towards a target region, the rays of light establishing a vertical angular span;
    a receiver configured to receive rays of light from the target region; and
    control circuitry configured to:

determine a height of the overhead obstacle using received rays of light;

select a first received ray of light that interacts with the overhead obstacle:

select two received rays of light that interact with a roadway underlying the overhead obstacle; and estimate a second received ray of light from the two received rays that interact with the roadway, the estimated second received ray and the first received ray corresponding to the same horizontal distance from the vehicle.

11. The system of claim 10, wherein the transmitter is configured to simultaneously emit the rays of light over the range of angles towards the target region, the simultaneously-emitted rays of light establishing the vertical angular span.

12. The system of claim 10, wherein the receiver comprises a one-dimensional array of pixels wherein each pixel corresponds to a range of angles of the received light.

13. The system of claim 10, wherein the control circuitry is configured to use a determined distance from the optical detection system to the ground to determine a horizontal distance from the vehicle to the location where the received rays of light interact with the target region.

14. The system of claim 10, wherein the control circuitry is configured to generate an alert if a determined height of the overhead obstacle is smaller than the vehicle height.

15. The system of claim 10, wherein the control circuitry is configured to automatically brake the vehicle if a determined height of the overhead obstacle is smaller than the vehicle height.

16. The system of claim 10, wherein the control circuitry is configured to determine the height of the overhead obstacle for multiple pairs of received rays of light, wherein each individual pair of rays includes rays that have the same horizontal distance.

17. The system of claim 16, wherein the control circuitry is configured to select a minimum determined height of the overhead obstacle as the height of the overhead obstacle.

18. A system for determining a clearance of an overhead obstacle for a vehicle, the system comprising:

means for emitting rays of light from a vehicle over a range of angles towards a target region, the rays of light establishing a vertical angular span;

means for receiving rays of light from the target region in response to the emitted rays of light, and means for determining a height of the overhead obstacle using received rays of light, including:

selecting a first received ray of light that interacts with the overhead obstacle;

selecting two received rays of light that interact with a roadway underlying the overhead obstacle; and estimating a second received ray of light from the two received rays that interact with the roadway, the estimated second received ray and the first received ray corresponding to the same horizontal distance from the vehicle.

19. The system of claim 18, wherein the means for emitting rays of light is configured to simultaneously emit rays of light over a range of angles towards a target region, the rays of light establishing a vertical angular span.

20. The system of claim 18, wherein the means for receiving rays comprises a one-dimensional array of pixels wherein each pixel corresponds to a range of angles of the received light.

* * * * *

UNITED STATES PATENT AND TRADEMARK OFFICE
CERTIFICATE OF CORRECTION

PATENT NO.        : 10,229,596 B1                      Page 1 of 1
APPLICATION NO.   : 15/726086
DATED             : March 12, 2019
INVENTOR(S)       : Harvey Weinberg It is certified that error appears in the above-identified patent and that said Letters Patent is hereby corrected as shown below:

In the Claims

In Column 9, Line 4, in Claim 10, delete "obstacle:" and insert --obstacle;-- therefor In Column 10, Line 13, in Claim 18, delete "light," and insert --light;-- therefor Signed and Sealed this
Twenty-first Day of April, 2020

Andrei Iancu
*Director of the United States Patent and Trademark Office*